US009002342B2

(12) United States Patent
Tenhunen et al.

(10) Patent No.: US 9,002,342 B2
(45) Date of Patent: Apr. 7, 2015

(54) SYSTEM, APPARATUS, AND METHOD FOR DYNAMICALLY CUSTOMIZING AND CONFIGURING APPLICATIONS

(75) Inventors: Jouko U. Tenhunen, Helsinki (FI); Jyrklpe Berg, Lohja (FI); Atte Lahtiranta, Espoo (FI); Miikka Sainio, Kerava (FI); Mika Mannermaa, Espoo (FI); Hannu Pankakoski, Vantaa (FI)

(73) Assignee: Nokia Corporation, Espoo (FI)

( * ) Notice: Subject to any disclaimer, the term of this patent is extended or adjusted under 35 U.S.C. 154(b) by 1786 days.

(21) Appl. No.: 11/293,885

(22) Filed: Dec. 2, 2005

(65) Prior Publication Data
US 2007/0130156 A1    Jun. 7, 2007

(51) Int. Cl.
| H04M 3/00 | (2006.01) |
| G06F 9/445 | (2006.01) |
| H04W 4/00 | (2009.01) |
| H04W 8/22 | (2009.01) |
| H04W 24/02 | (2009.01) |

(52) U.S. Cl.
CPC .. *G06F 8/60* (2013.01); *H04W 8/22* (2013.01); *H04W 4/001* (2013.01); *H04W 24/02* (2013.01); *G06F 9/44505* (2013.01)

(58) Field of Classification Search
CPC ......... H04W 4/001; H04W 4/02; H04W 8/22; H04W 24/02; H04W 24/04
USPC .......... 455/418–420, 566; 709/203, 208, 216, 709/219, 227, 228, 220
See application file for complete search history.

(56) References Cited

U.S. PATENT DOCUMENTS

| 5,852,722 | A | | 12/1998 | Hamilton |
| 5,875,186 | A | | 2/1999 | Belanger et al. |
| 5,956,636 | A | * | 9/1999 | Lipsit ............................ 455/411 |
| 6,029,196 | A | | 2/2000 | Lenz |
| 6,622,017 | B1 | * | 9/2003 | Hoffman ........................ 455/419 |
| 6,643,506 | B1 | * | 11/2003 | Criss et al. .................... 455/419 |
| 6,968,184 | B2 | * | 11/2005 | Criss et al. .................... 455/418 |

(Continued)

FOREIGN PATENT DOCUMENTS

| EP | 1531645 | 5/2005 |
| WO | WO 98/26548 | 6/1998 |
| WO | WO 01/67285 A2 | 9/2001 |
| WO | WO 03/017077 A1 | 2/2003 |
| WO | WO 2005/062652 | 7/2005 |

OTHER PUBLICATIONS

Nokia, "Preminet Solution", printed from Internet Apr. 1, 2006.
Nokia, "Preminet Client", printed from Internet Apr. 1, 2006.
Nokia, FAQ: The Preminet Client Solution, Feb. 13, 2006.
Yegin et al., "Supporting Optimized Handover for IP Mobility—Requirements for Underlying Systems", Internet Draft, Jun. 2002.

(Continued)

*Primary Examiner* — Olumide T Ajibade Akonai
(74) *Attorney, Agent, or Firm* — Alston & Bird LLP

(57) ABSTRACT

A system and method for dynamically customizing and/or configuring applications on devices. The user interface of a base application resident on a terminal can be modified in accordance with the invention. Terminal-related information is transmitted from the terminal upon initial activation of the base application at the terminal. The terminal-related information is received at a configuration server system, where application variant information for the terminal is derived based on the terminal-related information. This application variant information is transmitted back to the terminal, and the user interface of the base application is modified as specified by the application variant information.

25 Claims, 6 Drawing Sheets

(56) References Cited

U.S. PATENT DOCUMENTS

| | | | |
|---|---|---|---|
| 7,290,029 B2* | 10/2007 | Tang et al. | 709/203 |
| 7,457,878 B1* | 11/2008 | Mathiske et al. | 709/227 |
| 7,512,651 B2 | 3/2009 | Offermann | |
| 7,519,681 B2* | 4/2009 | Edwards et al. | 709/217 |
| 7,565,141 B2* | 7/2009 | Macaluso | 455/419 |
| 7,881,745 B1* | 2/2011 | Rao et al. | 455/551 |
| 2002/0029252 A1* | 3/2002 | Segan et al. | 709/217 |
| 2003/0028427 A1* | 2/2003 | Dutta et al. | 705/14 |
| 2003/0046677 A1 | 3/2003 | Lindberg et al. | |
| 2003/0078053 A1 | 4/2003 | Abtin et al. | |
| 2004/0033798 A1* | 2/2004 | Robin et al. | 455/419 |
| 2005/0021935 A1* | 1/2005 | Schillings et al. | 713/1 |
| 2005/0210525 A1 | 9/2005 | Carle et al. | |
| 2005/0259883 A1* | 11/2005 | Lunetta et al. | 382/248 |
| 2005/0275566 A1 | 12/2005 | Lahtiranta et al. | |
| 2006/0015520 A1 | 1/2006 | Lahtiranta | |
| 2006/0092890 A1 | 5/2006 | Gupta et al. | |
| 2006/0215623 A1 | 9/2006 | Lin et al. | |
| 2008/0003991 A1* | 1/2008 | Sievers et al. | 455/418 |

OTHER PUBLICATIONS

Zafeiris et al., "An Agent-based Architecture for Handover Initiation and Decision in 4G Networks", Proceedings of the Sixth IEEE International Symposium on a World of Wireless Mobile and Multimedia Networks, @005.

QUALCOMM Press Release, "QUALCOMM Announces Availability of User Interface Development Support for Brew®", Jun. 7, 2004.

International Search Report and Written Opinion from International Patent Application No. PCT/IB2006/003546, mailed Jan. 22, 2009.

International Search Report and Written Opinion from International Patent Application No. PCT/IB2006/001881, mailed Dec. 19, 2007.

Extended Search Report from European Patent Application No. 06821045.9, dated Sep. 7, 2009.

Office Action from Russian Patent Application No. 2008121764/09(025835), dated Oct. 20, 2009.

Office Action from Russian Patent Application No. 2008121764/09(025835), dated Mar. 29, 2010.

Office Action from Canadian Patent Application No. 2,631,696, dated Nov. 2, 2010.

* cited by examiner

SYSTEM, APPARATUS, AND METHOD FOR DYNAMICALLY CUSTOMIZING AND CONFIGURING APPLICATIONS

FIELD OF THE INVENTION

This invention relates in general to device configuration, and more particularly to a systems, apparatuses, computer program products, and methods for dynamically customizing and/or configuring applications on devices.

BACKGROUND OF THE INVENTION

In recent times, functional capabilities of computers and communication devices continue to migrate towards one another. Computers are used for electronic mail, file transfer, and even telephone communications. Communication devices such as mobile phones originally provided primarily telephone services, but now continue to gain processing power and capabilities traditionally limited to computers. For example, mobile devices now typically include capabilities to send and receive electronic mail (e.g., e-mail, Short Message Service, Multimedia Messaging Service, etc.), as well as data communication capabilities. These advances in mobile devices and the associated mobile network infrastructures allows mobile devices to gain access to content and other data that was once only within the ambit of larger, wired computers.

Mobile operators and service providers have taken advantage of these new capabilities of mobile terminals. A variety of mobile content is now available to mobile terminal users, including images, ring tones, music files, games, calendars, contact management, device utilities, and so forth. While these advances benefit operators, service providers, users and others involved in the content distribution chain, some complexities arise as a result of the various developers, service providers, operators and other vendors who provide services that ultimately enable this content to be provided to end-users. For example, the content/service providers need to be able to make their content/services available to the consuming public. Operators often have different service/content offerings, and need to have a way to identify and select the desired service/content that they will offer.

Another complexity involves the delivery and presentation of this content and/or services in a manner desired by the content providers and operators. Just as retail products are labeled according to the entity that makes the products, it is advantageous for mobile content/service providers and operators to present certain mobile content and services with their own look and feel. Currently, this is done by creating several variants of the applications, and installing them on terminals at the factory or otherwise prior to retail purchase or normal use. These different application variants present a significant burden to product development. For example, content may need to be ready months before the terminal is shipped or otherwise leaves the facility where the content is installed. Other disadvantages with such prior art methodologies is that it is difficult to later update the developers/operators desired user interface presentation characteristics once these application variants have initially been installed on the terminal.

Accordingly, there is a need for a manner of allowing developers, operators and the like to be able to brand their network-accessible products and services, while avoiding the burdens addressed above. The present invention fulfills these and other needs, and offers a variety of advantages over prior art solutions.

SUMMARY OF THE INVENTION

To overcome limitations in the prior art described above, and to overcome other limitations that will become apparent upon reading and understanding the present specification, the present invention discloses systems, apparatuses, computer program products, and methods for dynamically customizing and/or configuring applications on devices.

In accordance with one embodiment of the invention, a method is provided for modifying a base application resident on a terminal. Terminal-related information is transmitted from the terminal upon initial activation of the base application at the terminal. Application variant information is received from a configuration server system, which is used to modify a user interface of the base application.

In more particular embodiments of such a method, the method may involve providing the same base application on each of a plurality of terminals. In such an embodiment, the terminal-related information is respectively transmitted from each of the terminals when each particular terminal respectively performs its initial activation of the base application. The user interface of each base application is modified at each of the terminals when the respective terminal receives its application variant information from the configuration server.

In another particular embodiment of such a method, the terminal retrieves an address of the configuration server upon initial activation of the base application, and transmits the terminal-related information to a configuration server that is addressed by the address. The address is a Uniform Resource Identifier (URI) in some embodiments.

In some embodiments, the application variant information correlates to entity-specific information associated with at least one entity in a distribution chain of deliverable content to which the base application is requesting. The user interface of the base application may then be modified to include such entity-specific information.

In particular embodiments of the method, the user interface of the base application is modified with visual presentations, audio presentations, and/or tactile presentations. Visual presentations may include, for example, display backgrounds, logos, icons, color schemes, trademarks, service marks, etc.

Embodiments of the invention involve various types of terminal-related information, all or part of which may be provided to the configuration server. This may include information identifying characteristics of the terminal, examples of which include a User Agent Profile (UAProf), International Mobile Equipment Identifier (IMEI), the terminal's current language selection, possible roaming indicator etc. In other embodiments the terminal-related information includes information identifying the operator or service provider associated with the service utilized by the base application. For example, this may include the Mobile Country Code (MCC), Mobile Network Code (MNC), Service Provider Name (SPN), or Short Message Service Center (SMSC) number and/or other information that can identify the operator, service provider, etc. In yet other embodiments, the terminal-related information can include information identifying whether the terminal is a variant, wherein the information comprises firmware. Other embodiments include a Unique Identifier (UID) that uniquely identifies the base application. These and other types of terminal-related information may be provided to the configuration server to allow the configuration server to identify the proper application variant information to provide to the terminal.

In other embodiments of such a method, updated application variant information may be obtained after obtaining the application variant information upon the initial activation of the base application. For example, this may involve obtaining the updated application variant information each time the terminal is in communication with the configuration server, periodically, in response to a triggering event, etc.

In accordance with another embodiment of the invention, a method is provided for facilitating modification of a base application capable of residing on a terminal. The method involves receiving terminal-related information which relates to the terminal, and deriving application variant information based on the terminal-related information, where such application variant information is usable by the terminal to modify a user interface of the base application. The application variant information is then transmitted to the terminal where the user interface of the base application can be modified accordingly.

Other features of such a method may include determining whether the software version of the base application corresponds to an earlier version of the base application. This may be provided by way of, for example, the terminal-related information. In response, an updated software version of the base application can be provided if it is determined that the version of the base application corresponds to an earlier version (e.g., out of date version) of the base application.

In some particular embodiments of the method, content is provided to the terminal together with the application variant information, where such content relates to the particular base application being executed on the terminal. For example, the content may be a list of selectable catalogs, where the base application is a catalog client.

Other embodiments of this method involve deriving the application variant information by identifying, using the terminal-related information, the appropriate application variant information from multiple variant data sets defined or otherwise associated different entities. Stated differently, the terminal-related information may be used to identify an appropriate entity-defined variant data set from multiple variant data sets associated with various entities. The variant information may in essence be culled from a set of variant information associated with the different entities.

In accordance with another embodiment of the invention, a server operable on a network is provided. The server includes a receiver configured to receive terminal-related information transmitted from a terminal upon a first activation of a client at the terminal. A user interface variant identification module is provided which is executable by a processing arrangement and configured to derive modified user interface information for the client based on the terminal-related information. A transmitter is configured to transmit the modified user interface information to the terminal for use by the client in modifying the client user interface.

Particular embodiments of such a server involve a database of the modified user interface information that is available for multiple terminals, where the user interface variant identification module is configured to identify within the database the modified user interface information for a particular terminal based on the terminal-related information provided by that particular terminal. In other embodiments, multiple servers are provided in a distributed fashion; i.e. distributed to multiple server locations where at least some of the modified user interface information is replicated in databases associated with each of the multiple server locations. In another embodiment, a redirect module is provided that is executable by the processing arrangement and configured to redirect the terminal-related information and responsibility of deriving the modified user interface information to an alternative server addressable by an address available to the server.

In other particular embodiments, the processing arrangement is configured to derive the modified user interface information by choosing the modified user interface information from a set of variant information collectively defined by multiple entities. In another embodiment, the processing arrangement is configured to derive the modified user interface information by using the terminal-related information to identify an entity-specific modified user interface information from a plurality of modified user interface information sets corresponding to different entities.

In accordance with another embodiment of the invention, a terminal is provided that is capable of transmitting and receiving information. The terminal includes a user interface, a transmitter, and a memory/storage element(s) to store at least a base application, access information of a configuration server, and terminal-related information. The terminal includes a processing system that is configured to recognize an initial activation of the base application on the terminal, and to direct the transmitter to transmit the terminal-related information to the configuration server in response to recognizing the initial activation of the base application. A receiver is configured to receive user interface modification information generated at the configuration server based on the terminal-related information. The processing system then modifies a presentation associated with the base application by way of the user interface, as specified by the user interface modification information.

In more particular embodiments of such a terminal, the terminal may be a mobile phone, PDA, computing device, etc. In one embodiment, the terminal is capable of wireless communication with a network. The terminal may include a display(s), where the presentation associated with the base application involves at least a visual presentation provided on the display(s). A speaker(s) may also be provided, in which case some of the presentation to the user may be by way of audio. Other user interface mechanisms may similarly be employed, such as tactile feedback or other known user interface mechanisms.

In accordance with another embodiment of the invention, computer-readable media is provided which has instructions stored thereon that are executable by a processing system for modifying a user interface of a client application resident on a terminal. These computer-executable instructions stored on the media perform steps including receiving terminal-related information from the terminal upon a first activation of the client application at the terminal, deriving modified user interface information for the client application based on the terminal-related information, and transmitting the modified user interface information to the terminal for use by the client application in modifying the client user interface.

In accordance with another embodiment of the invention, computer-readable media is provided which has instructions stored thereon that are executable by a processing system for modifying a client application resident on a terminal. These computer-executable instructions stored on the media perform steps including detecting a first activation of the client application, and transmitting terminal-related information relating to the terminal upon detection of the first activation of the client application. Application variant information derived from the terminal-related information is received, and a user interface of the client application is modified based on the application variant information.

In accordance with another embodiment of the invention, a system is provided for modifying a client application. The system includes at least a terminal and a configuration server. The terminal includes a user interface, and a terminal processing system configured to recognize a first activation of the client application on the terminal, to initiate transmission of terminal-related information to the target address in response to recognizing the initial activation of the client application, and to modify a presentation associated with the client application via the user interface pursuant to received user interface modification information. The configuration server includes a receiver configured to receive the terminal-related information, and a user interface variant identification module executable by a server processing system and configured to derive the user interface modification information based on the terminal-related information. The configuration server further includes a transmitter configured to transmit the user interface modification information to the terminal, for use by the client application in modifying the presentation associated with the client application by way of the user interface.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described particular representative examples of systems, apparatuses, computer program products, and/or methods in accordance with the invention.

BRIEF DESCRIPTION OF THE DRAWINGS

The invention is described in connection with the representative embodiments illustrated in the following diagrams.

DETAILED DESCRIPTION OF THE INVENTION

Figure 1:
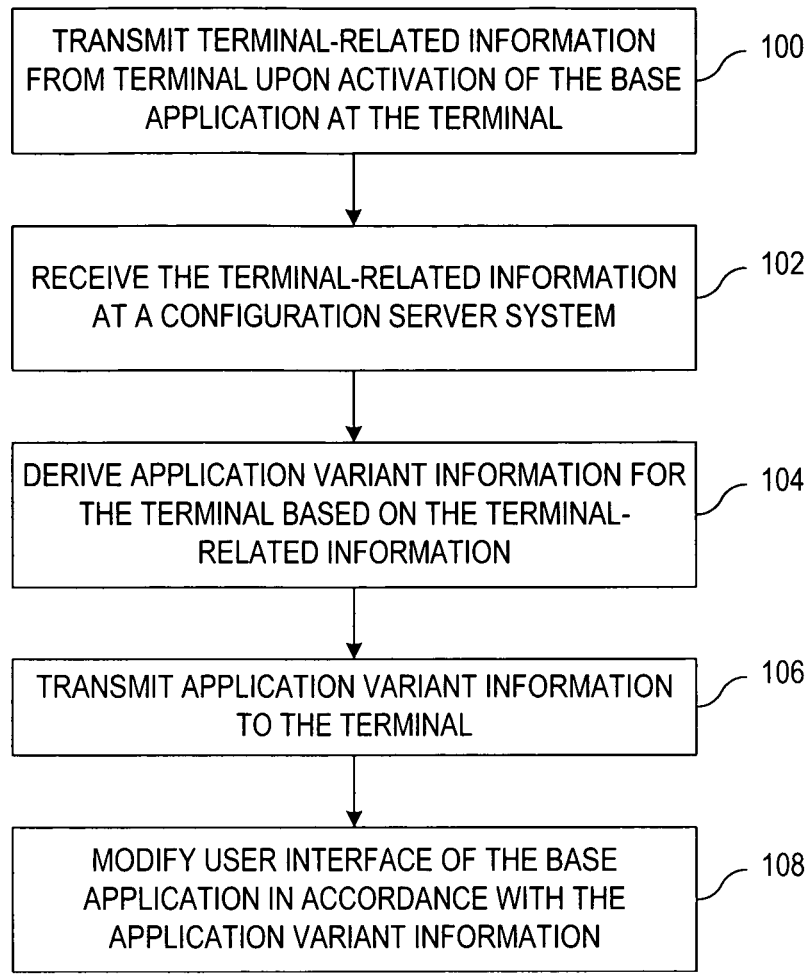
FIG. 1 is a flow diagram illustrating a representative method for modifying a base application resident on a terminal in accordance with the principles of the invention.

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides systems, apparatuses and methods for applying one or more application variants to a base application(s) upon initial activation or other initial use of the base application. For example, a method that may be implemented in accordance with the principles of the invention involves a manner for modifying a base application(s) resident on a terminal. The terminal may include, for example, mobile phones, Personal Digital Assistants (PDAs), laptop/notebook computers, workstations, and/or other devices capable of executing applications and communicating information to and from a network(s). These devices may communicate with a network via wireless and/or wired mechanisms. The base application(s) may be, for example, an application(s) that is installed on or otherwise delivered to the terminal at the time of manufacture or other time prior to retail delivery, or may be delivered to the terminal at a retail store or after purchase of the terminal by a user. These representative examples are to merely show that any device that executes applications that can be made to reside on the terminal, and can communicate with other devices via a network or otherwise, can be used in connection with the present invention.

The illustrative method for modifying a base application(s) resident on the terminal includes embodiments where terminal-related information is transmitted from the terminal upon activation (including any predefined initial use) of the application at the terminal. For example, a common "base" application or client may be delivered as a resident application/client in a terminal or group of terminals. When a user, retailer, testing personnel or the like initially activates or otherwise uses the base application for the first time, terminal-related information is transmitted from the terminal. When referring to "first time," this means the first time the application is activated/used under normal circumstances, such as the first time a user invokes the particular application. In other words, there may be prior design, testing, experimental, etc uses where the feature is disabled, prior to the first actual activation/use of the application under normal circumstances.

As is described more fully below, this terminal-related information may include any number of different attributes, including any one or more of characteristics of the specific terminal, identifications of the operator/service provider associated with the terminal, terminal firmware, client identifiers, phone language and others. This information is received at a server(s) for processing. The server may receive the information via one or more networks, including Global Area Networks (GANs) such as the Internet or other wide-area networks, mobile networks such as Global System for Mobile Communications (GSM), General Packet Radio System (GPRS), CDMA, short-range or "proximity" networks such as via local Wireless Access Points (WAPs) in the case of Bluetooth and/or other networks, etc. It is relevant only that the terminal can provide its terminal-related information via the relevant network(s) to reach the specific or distributed server system of the invention. This stand-alone or distributed server system is hereinafter interchangeably referred to as configuration server system, or configuration database (CDB) which represents the database of information associated with the configuration server system. The configuration server system derives application variant information for the terminal associated with the received terminal-related information, and uses the terminal-related information as the basis for deriving the application variant information. Accordingly, the configuration server system may derive or otherwise create different application variant information for different terminals having different terminal-related information.

When this application variant information is derived or otherwise obtained via the configuration server system, it is transmitted back to the terminal where it is used to modify the application (that was undergoing its first activation/use) in accordance with the application variant information. For example, in one embodiment, the application variant information includes user interface (UI) information including any one or more of display backgrounds, icons, brand information, colors, audio, etc. In this manner, the same, common base application may be provided on a number of terminals being placed on the market, and operator-specific, service provider-specific, vendor-specific or other analogous information may be used to modify the application presentation accordingly. In a more particular embodiment, the application variant information provides branding and/or skinning information to modify the first-time-used application at the terminal.

Thus, embodiments of the present invention provide mechanisms and methods for automating and enabling updating, configuring, branding and/or other modifications to post-sales terminal applications based on any one or more attributes. The updating, configuring, branding, etc. can involve partial or entire modifications to the application. The invention provides a number of advantages and benefits, such as shortening the time in which it takes before shipping a new terminal with bundled content. Currently, content must be ready months prior to shipping, which includes specific content for every application variant that may be used for any of the terminals. The invention also provides consistency and reduces latency issues. For example, where an operator-specific variant of an application is installed on a mobile phone during manufacture, it may be months before a user actually uses the application, and the UI or other modifications desired by the operator may already be out of date. The present invention ensures that the user will modify the application upon first use with the most recent configuration data available in the configuration server system. Further, because the configuration server system can be implemented as a globally-hosted database, such a distributed system provides redundancy with minimized latency to serve any client consistently, regardless of the terminal users' whereabouts. Another advantage is that the configuration server system can aggregate collections of media gathered from multiple independent sources, where these collections of media (and/or updates to such collections) can be provided to the users. The aforementioned advantages are merely representative examples of advantages provided by the present invention, and does not represent an exhaustive list of all of the advantages provided by the present invention.

FIG. 1 is a flow diagram of one embodiment according to the invention, involving a method for modifying a base application resident on a terminal. This method includes transmitting 100 terminal-related information from the terminal upon activation of the base application at the terminal. The base application can represent any application for which application variance is to be applied in accordance with the principles of the present invention. In one embodiment the initial activation of the base application refers to a user's first access of the application, such as when the user of the terminal first invokes the application for use. In one embodiment, the transmission 100 of the terminal-related information is effected by way of one or more networks. For example, in the context of mobile terminals, the mobile terminal may transmit the information via a wireless network such as a cellular network (GSM/GPRS, CDMA, etc.). The mobile terminal may also transmit the information via a wireless local area network (WLAN), Bluetooth network, or other proximity network. The terminal may also be coupled to a network via a wired connection, such as an ethernet connection. Any manner of connecting to a network to ultimately access the configuration server system of the present invention is suitable.

The terminal-related information transmitted from the terminal is received 102 at the configuration server system. The configuration server system derives 104 application variant information for the terminal based on the terminal-related information provided by the terminal. For example, the terminal-related information may include information relating to the operator/service provider, terminal characteristics and the like, and from this information the appropriate application variant information for that terminal can be accessed from the CDB. The application variant information is then transmitted 106 back to the terminal, where it can be used by the terminal to modify the base application accordingly. Such modification may include modifying the user interface (UI) of the base application in a manner identified by the application variant information, as described more fully in connection with ensuing exemplary embodiments.

Figure 2:
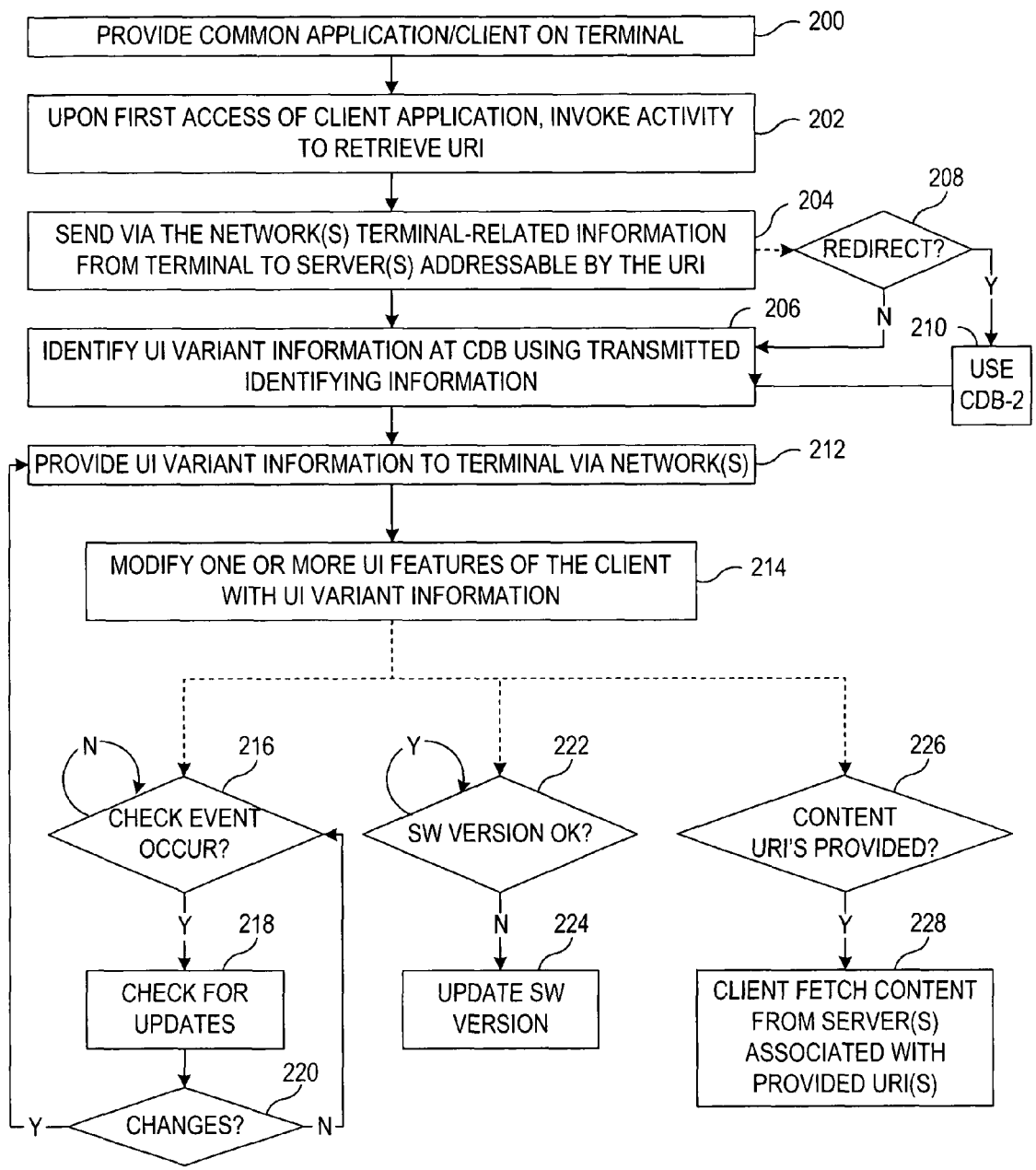
FIG. 2 is a flow diagram of other representative methods for modifying a terminal-resident client application based on terminal-related information.

FIG. 2 is a flow diagram of a more particular embodiment of the invention, whereby a mobile terminal is able to modify the user interface (UI) of a resident application in accordance with the principles of the present invention. As will be shown in the embodiment of FIG. 2, this embodiment delivers a base or "vanilla" client within a mobile (or other) terminal. When the client is opened for the first time, it sends the necessary information to a global configuration server (e.g., configuration server system) which is equipped with a configuration database (e.g., CDB). The package of information retrieved from the CDB (using the information provided by the client) is provided to the terminal to skin or otherwise modify the UI of the terminal. The CDB may also check other information, such as whether the software version of the accessing client is up to date, and provide a new version for installation on-the-fly. Furthermore, in other particular embodiments described in ensuing figures, the CDB may return a list of different URIs, such as different catalogs' URIs, from which the client can fetch the actual content that is for sale and/or distribution.

Referring now to FIG. 2, the illustrated embodiment involves a method where a common or "base" application is provided 200 to the application/client on the terminal. For example, when a mobile terminal is being manufactured, various applications may be installed on the terminal. According to the present invention, such an application can be the same base application, which can then be updated with the appropriate client variants as described below. More particularly, upon first access of the client application, an activity to retrieve a stored Uniform Resource Identifier (URI) can be invoked 202. This URI, hereinafter referred to as the "Master URI," can be retrieved in any known manner. For example, the "activity" that is invoked at block 202 may involve invoking an application or API that manages retrieval of the URI. In another embodiment, the base application itself may include instructions to invoke a memory operation, such that the processor(s) operating on the terminal retrieve the Master URI from a known memory/storage location. In yet another embodiment, the Master URI is retrieved from a remote server. Any manner of retrieving the Master URI may be used in accordance with the invention.

Using the Master URI as an address of the configuration server system, the terminal sends 204 certain terminal-related information from the terminal to the configuration server system via a network(s). This terminal-related information may include any information that can identify the appropriate UI variant information in the CDB of the configuration server system. For example, the terminal-related information may include information for determining the terminal type and characteristics. One such example is a User Agent Profile (UAProf) that describes the capabilities of a device and/or client. This or analogous profile information may include hardware and software characteristics of the terminal, such as the display size, resolution, audio capabilities, operating system, network characteristics (e.g., GSM/GPRS capable), browser or other access application particulars, etc. Terminal-related information may also/instead include information to determine the operator and/or service provider, such as a Mobile Country Code (MCC), Mobile Network Code (MNC), Service Provider Name (SPN), Short Message Service Center (SMSC) numbers, etc. This information may be derived from the Subscriber Identify Module (SIM) or otherwise. Other terminal-related information may include information to determine whether the terminal is a variant, such as firmware information. Terminal-related information may also/instead include terminal and/or client information, such as an International Mobile Equipment Identifier (IMEI), a Unique Identifier (UID) that uniquely identifies the client/application. Still further examples of terminal-related information include the terminal's current language selection, roaming indicator, etc.

As indicated above, the terminal-related information may include information to determine the operator, service provider, application developer, or other similar entity. For example, information such as the MCC, MNC, SPN, SMSC and the like may be used by the receiving configuration server to select the appropriate UI variant information from an aggregation of variant information owned and/or defined by different entities. As an example, if the MCC, MNC and/or SPN is provided as part of the terminal-related information, the configuration server may identify a particular operator who has defined certain application variant information to be provided when the MCC, MNC and/or SPN corresponds to that particular operator. Thus, this variant information may be provided by, controlled, maintained and/or otherwise defined by operators, service providers, application developers and the like, and in some embodiments the configuration server uses the relevant terminal-related information to identify which variant information (or subset of variant information) among the collection or totality of variant information associated with these entities is to be selected. An exemplary implementation of such an embodiment may include providing information such as the MCC, MNC, SPN or other codes that can be obtained at the terminal, such as via the terminal's SIM or other storage. Other information such as the Internet Protocol (IP) address from which the query is originating can be traced back to the operator's network and possibly to particular nodes such as a WAP gateway. This information may be gathered manually from operators and other data sources (e.g., MCC/MNC lists available to the public) and configured to the configuration database. The updating of the variant information of different entities at the configuration server may be performed manually at the configuration server, or otherwise such as allowing operators, service providers and others to update their variant information via an appropriate service. There are various manners in which different entities can obtain, update and/or manage their respective variant information made available by the configuration server, and the present invention is applicable to any such manners.

Different combinations of these and/or other terminal-related information may be used to identify 206 particular UI variant information at the CDB. For example, the information may be used to index or otherwise locate particular UI variant data stored at the CDB. In an alternative embodiment the CDB may optionally redirect the query to any other URI, as determined at decision block 208. If redirection is to be employed in this fashion, a different CDB (e.g., CDB-2) may be used 210. Using redirection in this manner provides the ability to create CDB subsystems, such as virtual CDBs within the global CDB system, that are dedicated to different purposes and can ensure flexible scalability.

In another embodiment, the Master URI can in some cases be configured not to point to the globally-hosted CDB, but rather to some other URI. For example, the URI could point to an operator/service provider's or other vendor's own CDB. In such an example, the operator, service provider or other entity could keep information separate from the globally-hosted CDB and provide this information themselves. This may be particularly practical where the terminal is manufactured as a variant for a particular operator, service provider, etc., where it may be known that the CDB data will be associated with that particular operator, service provider, etc.

When the particular UI variant information has been identified 206, it is provided 212 to the terminal. In an exemplary embodiment of the invention, this is provided via a network(s), although it is feasible to provide the information directly between the terminal and CDB by way of point-to-point transmission. When the terminal has received the information, it may modify 214 one or more UI features of the client with the UI variant information. For example, this UI variant information may be used to skin the client with operator-specific, service provider-specific or similar entity-specific branding, logos, icons, backgrounds, audio, tactile feedback (vibration) and/or other perceptible UI features or overlays.

This may be particularly useful in situations where mobile operators or other network service entities may want certain terminal applications to be branded to incorporate that entity's look and feel. One existing prior art manner of providing this information is to create several variants of the applications and install them in the factory, or in any event prior to the purchase or actual use of the terminal. The need for these multiple different variants cause significant burden to product development. The present invention allows as few as a single base application/client to be installed in the terminal, and the branding or other UI variations are effected when the client is first attempted to be used.

Various optional features may be implemented in connection with the UI variation system and methodology of the present invention. FIG. 2 illustrates some representative examples of such optional features. For example, periodic and/or situation-triggered events may invoke subsequent queries to the configuration server system to check for updated UI and/or other CDB data. This is depicted at decision block 216, where it is checked whether a particular event(s) occurred to trigger such a subsequent query(s). As a more particular example, the terminal client may have a pre-defined refresh counter that causes it to invoke a query to the CDB periodically (whereby the "event" may be the expiration of a time duration and/or reaching a pre-defined count). In another embodiment, if the client is already communicating with the configuration server system for any reason, the client can be configured to automatically make a request to refresh the UI information from that server. In yet another embodiment, the terminal user can be given the ability to force the client to contact the configuration server system (via the UI) to perform such a refresh. In any case, if such a request is made, the CDB checks for updates as shown at block 218. If there are changes to be made, this updated information can be provided 212 to the terminal, which in turn can again modify 214 the UI feature(s) of the client with the newly provided UI variant information.

Another optional feature includes having the CDB automatically check the software version of the accessing client, and provide a new version to be installed on-the-fly. For example, the software version may be checked 222, and if the software version is not up to date, the software version may be updated 224.

In another optional embodiment, one or more content URIs may be provided to the terminal, as determined at decision block 226. For example, the accessing client may be a client seeking information such as operator/service provider catalogs. It may be beneficial for an operator/service provider to be able to provide their logo, icon, look and feel, and/or other branding information as part of such a "catalog client." When the UI of the catalog client is modified in accordance with the present invention, any content URIs requested by and provided to the catalog client, as determined at decision block 226, can be presented to the user in the manner desired by the operator/service provider. If such content URIs are provided, the catalog or analogous client can fetch 228 the desired content from a server(s) addressable by the provided URI(s). Because such a catalogs client itself can fetch independent catalogs from multiple sources (indicated with URIs), a set of catalog addresses can be returned with some common theme, and CDB solution providers can provide end-users collections of media. For example, media may be gathered from multiple independent sources, such as from service provider-A, service provider-B, etc. The implementation of such a catalog client is a particularly practical use of the present invention, as the UI associated with the client in the terminal that is to access content from a particular operator/service provider may be branded or otherwise modified to reflect the operator/service provider of the content or content selections.

Still other optional features may be implemented, such as where a client is shared to another terminal (e.g., Bluetooth superdistribution), the stored Master URI in the terminal may enable the configuration of the shared client in the new host terminal, according to that particular end-user's and his/her service provider's profile. Further optional features may also be employed in connection with the present invention.

The invention thus provides, as described in connection with FIGS. 1 and 2, a solution that may be used for, among other things, configuring and branding settings and the UI of a terminal client. This may be based on the terminal variant's needs, local variants' needs, operators' needs, operators' post-sales needs, vendors' post-sales needs, etc. The solution may also be used for dynamically changing the content within the application by providing tailored content, such as a tailored URL-link list, based on various attributes of either/both the end-user's preferences, the terminal's capabilities, the operator's, service provider's or other content retailer's preferences, and the like. The invention may further be used for updating old software versions of the terminal counterpart application, which provides the actual service. Additionally, the information within the CDB may be updated directly via the terminals' variant databases and/or operators' databases, through appropriate Application Programming Interfaces (APIs) provided by the CDB. Reports and statistical data regarding the usage of the system and, for example, the number of clients accessing it, may also be gathered. The invention facilitates these and other uses.

Figure 3:
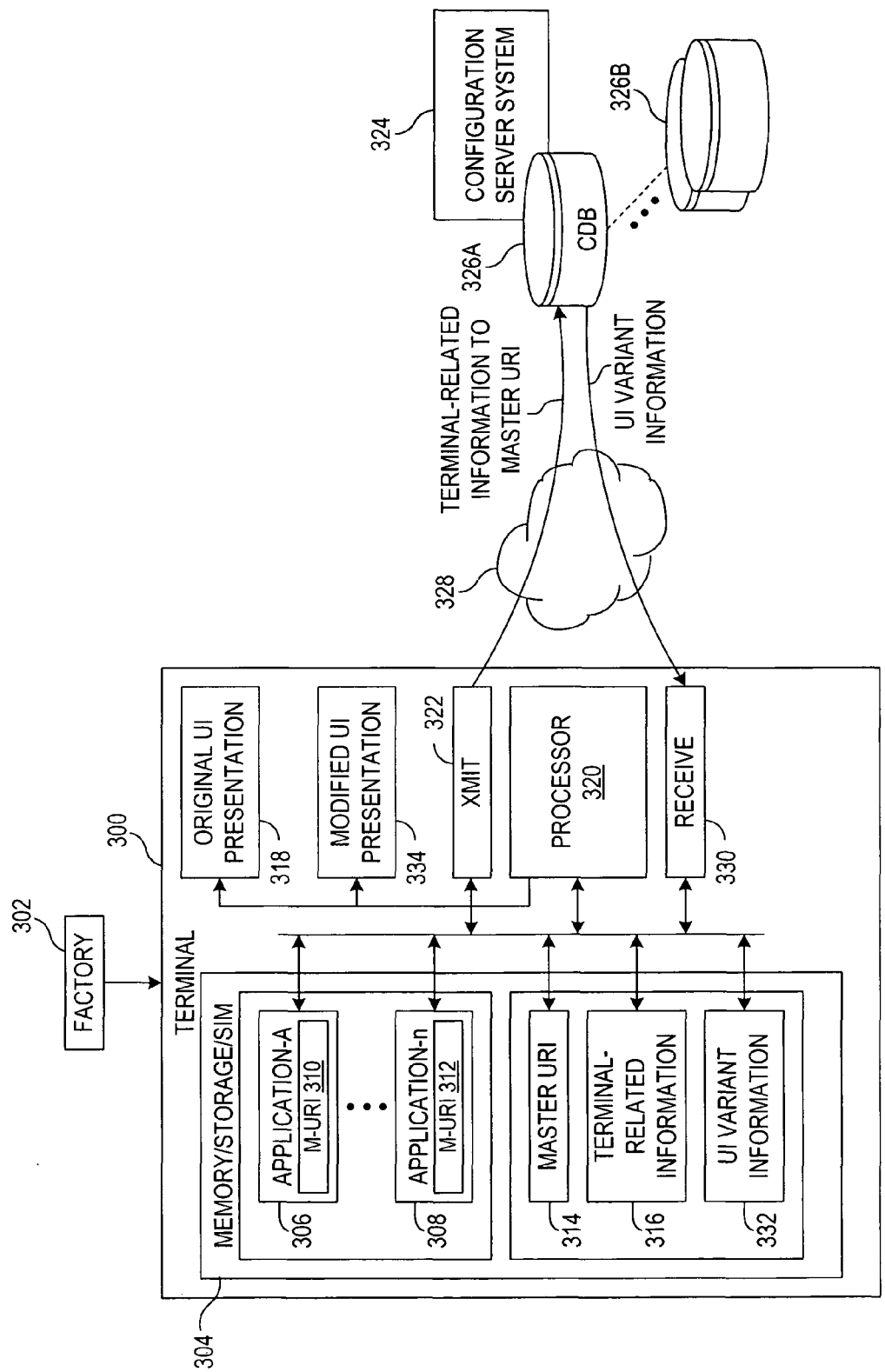
FIG. 3 is a block diagram illustrating one embodiment of representative terminal and configuration server systems in accordance with the present invention.

FIG. 3 is a block diagram illustrating one embodiment of a terminal and configuration server system in accordance with the present invention. In the illustrated embodiment, a terminal 300 is received as provided by the factory 302 or other development/manufacturing facility. The terminal includes any type of memory/storage 304, which may include temporary or non-volatile memory/storage, and may be affixed or removable relative to the terminal 300. One or more clients/applications 306, 308 are provided with the terminal 300. A Master URI (M-URI) 310, 312 may be provided for each application 306, 308. Alternatively, one or more Master URIs 314 may be stored for individual or collective use with the applications 306, 308. Terminal-related information 316 is stored or otherwise accessible to the terminal 300.

Assume that Application-A 306 is invoked for the first time. An original UI presentation 318 as set by the factory 302 for that Application-A 306 is provided. For example, in the context of visual UI features, a terminal 300 display device (not shown) as controlled by a processor 320 can present a first, default UI presentation. In another embodiment, the original UI presentation may be no presentation (e.g., blank screen, etc.). When Application-A 306 is opened or otherwise initiated by the user the first time (or otherwise in association with a particular user attempt to invoke the application), the relevant Master URI 310, 314 is retrieved, and the terminal-related information 316 is sent via transmitter 322 to the configuration server system 324 and associated CDB 326A, which correspond to the Master URI, via a network(s) 328. As previously indicated, the configuration server system/CDB may be distributed, as represented by the one or more additional, or in some cases virtual, CDBs 326B.

In response to the terminal-related information, the relevant UI variant information for the accessing terminal 300 is retrieved from the CDB 326A/B. This information is received via the receiver 330 of the terminal 300, and can be stored or otherwise associated with Application-A 306 as represented by block 332. The processor 320 can execute the Application-A 306 using the UI variant information 332 to provide a modified UI presentation 334. For example, the visual presentation of the Application-A 306 may now include a skin or other UI modifications to provide a new UI from which the user of the terminal 300 can view and/or interact with.

Figure 4A:
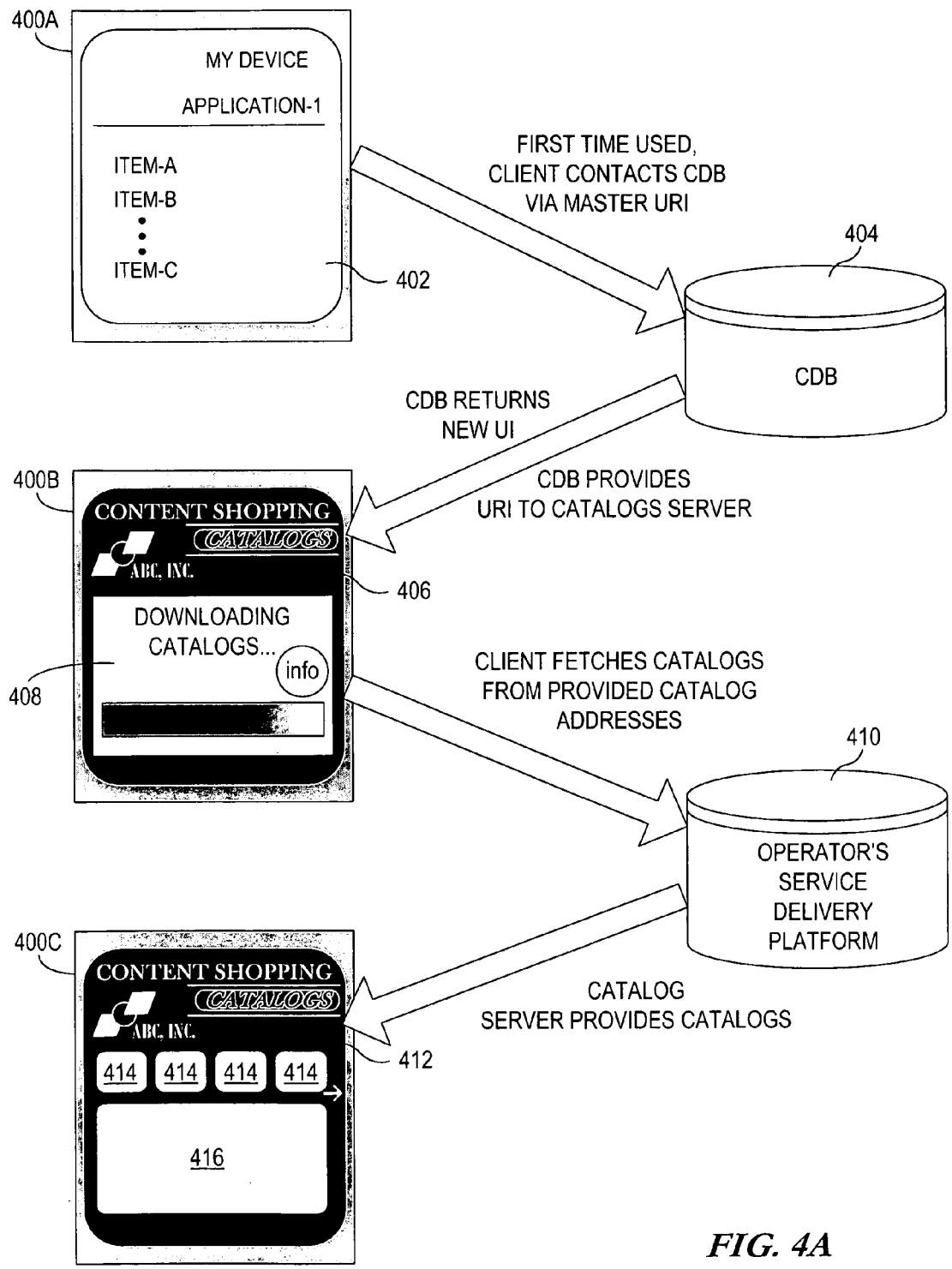
FIGS. 4A and 4B illustrate representative embodiments of the user interface (UI) variant infusion according to the present invention, whereby content made available by a particular operator is presented to the user with the operator's preferred UI.

As previously noted, the present invention may be used in connection with an online content catalog service(s). Such services may be implemented in accordance with systems as described herein, and/or as described in co-pending U.S. patent application Ser. Nos. 10/868,672 and 10/868,499, both of which are incorporated herein by reference in their entireties. In such a case, at least one of the applications/clients on the terminal to be impacted by the modified UI variants may be a catalog client. The CDB and/or associated database may include a master catalog serving as a catalog of mobile content, applications, services, etc. Developers can arrange to have their content, applications and services associated with a global and/or company-operated CDB to bring their solutions to any number of online retail storefronts. Different operators may have different offerings taken from the master catalog, whereby operator branded purchasing clients, portals, and other interfaces may be provided to users. The present invention allows such interfaces to be branded with operator and/or service provider characteristics, such as logos, icons, backgrounds, sounds, trademarks/servicemarks, colors, designs, etc., upon first use of such catalog clients. FIG. 4A provides a diagram of an exemplary embodiment of the UI variant infusion of the present invention, used in connection with a catalog client where content made available by a particular operator is presented to the user with the operator's preferred UI presented to the user.

As shown in FIG. 4A, a terminal display 400A may provide an original or default presentation 402 for the catalog client. This original/default client presentation 402 may be part of the base application—e.g., the default portion of the client installed at the factory for a volume of terminals shipped from the factory. Alternatively, the presentation 402 may be null or blank, in that the modified UI is obtained before any particular presentation is displayed. In any case, the first time that the catalog client is opened or otherwise used, the client contacts the CDB 404 using the Master URI previously described. The CDB 404 returns the new UI, namely the UI variant information that can be used to skin or otherwise modify the presentation. This new UI is displayed on the display 400B as presentation 406, which is different than the original/default presentation 402. In the case where the client is a catalog client as in the present example, the CDB 404 also provides the URI(s), i.e. address(es), to the catalogs server. The client fetches catalogs from the provided catalog address(es). During this time, a notification window 408 may be presented to notify the user and show the progress of the catalogs download. The catalogs are fetched from the operator's service delivery platform 410, which in turn provides the various catalogs and/or informational items as shown at presentation 412. Selectable catalogs and/or informational items are depicted for purposes of illustration at blocks 414, and block 416 represents an area for viewing more detailed information related to any one or more of the blocks 414.

It should be noted that applying the UI variant information to the terminal UI may occur at a time other than the initial return of information from the CDB 404. For example, the UI variants may be applied at the stage shown as presentation 412 rather than at the stage shown as presentation 406—i.e. at the time of providing the catalogs versus at the time of the client fetching the catalogs. As this example illustrates, the particular time at which the UI is actually modified at the user terminal using the UI variant information is not of particular significance.

Figure 4B:
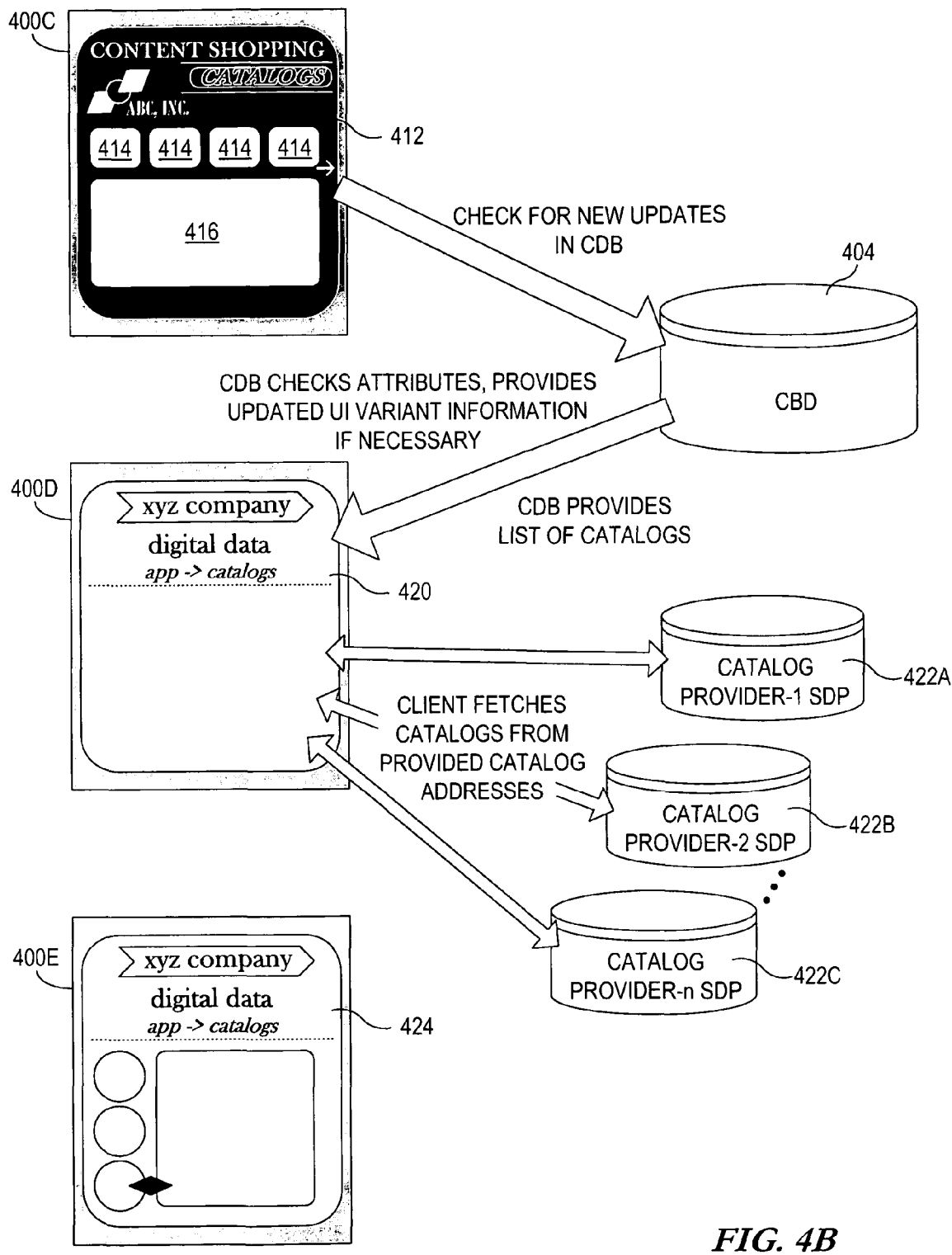

As was described in connection with FIG. 2, the present invention includes various optional features that may be used in connection with the present invention. One such feature is the periodic and/or event-triggering monitoring for UI variant updates in the CDB. For example, the operator, service provider and/or other entity may want to change any one or more of the colors, logos, icons, trademarks, or the like. Therefore, in addition to allowing the UI to be modified upon the first use of the particular client, subsequent updates are also possible in connection with the present invention. FIG. 4B provides a diagram of another exemplary embodiment of the UI variant infusion of the present invention, again described in terms of a catalog client for purposes of example only, where UI updates are made available to the terminal. Corresponding reference numbers between corresponding items in FIGS. 4A and 4B are used to facilitate an understanding of this feature of the invention.

FIG. 4B begins with presentation 412 as provided on the display 400C. The client, a catalog client in the present example, may check for updates of at least the UI variant information in the CDB 404. As was described in connection with FIG. 2, periodic and/or situation-triggered events may invoke subsequent queries to the configuration server system to check for updated UI variant and/or other CDB data. In connection with such a request, the client may again send a portion of all of the relevant terminal-related information or attributes to the CDB 404. The CDB checks these attributes and determines whether new UI variant information is available, and sends such new information if necessary. As shown at display 400D, new UI variant information is provided in the present example as shown by presentation 420. In the case where the client is a catalogs client, the CDB 404 provides a list of catalogs. In the present example, the client fetches the catalogs from different catalog providers 422A, 422B, 422C addressable by given particular addresses. These catalog providers may include service delivery platforms (SDP) hosted and managed by various entities. When the client has fetched the appropriate catalog(s), it can be displayed or otherwise presented, as shown at display 400E and corresponding presentation 424. As can be seen from the foregoing examples of FIGS. 4A and 4B, operator-specific, service provider-specific and/or other entity-specific user interfaces may be provided to the terminal upon first use of the associated client on the terminal.

Figure 5:
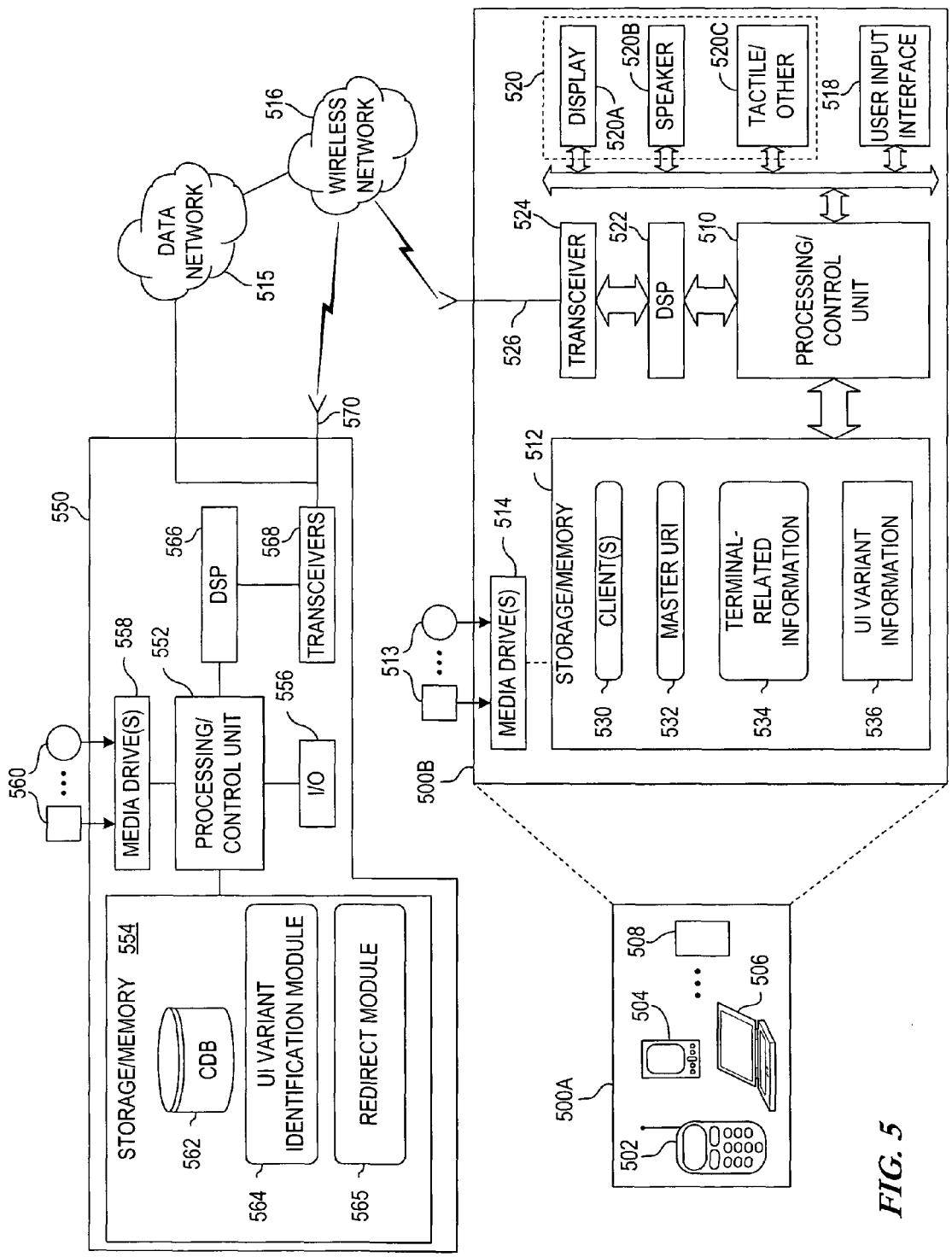
FIG. 5 illustrates a representative system in which the present invention may be implemented or otherwise utilized.

Hardware, firmware, software or a combination thereof may be used to perform the functions and operations in accordance with the invention. The terminals in accordance with the invention include any communication device capable of communicating over-the-air (OTA) with wireless networks and/or capable of communicating via wired networks. Such terminals include, for example, mobile phones, Personal Digital Assistants (PDAs), computing devices, and other networked terminals. A representative system in which the present invention may be implemented or otherwise utilized is illustrated in FIG. 5, where the terminal is represented as a wireless terminal capable of communicating information OTA.

The system includes one or more terminals 500A such as, for example, a mobile phone 502, PDA 504, computing device 506, or other communication device 508 capable of OTA communication. The terminal 500A utilizes computing systems to control and manage the conventional device activity as well as the functionality provided by the present invention. For example, the representative terminal 500B includes a processing/control unit 510, such as a microprocessor, controller, reduced instruction set computer (RISC), or other central processing module. The processing unit 510 need not be a single device, and may include one or more processors. For example, the processing unit may include a master processor and one or more associated slave processors coupled to communicate with the master processor.

The processing unit 510 controls the basic functions of the terminal 500B as dictated by programs available in the program storage/memory 512. The storage/memory 512 may include an operating system and various program and data modules associated with the present invention. In one embodiment of the invention, the programs are stored in non-volatile electrically-erasable, programmable read-only memory (EEPROM), flash ROM, etc., so that the programs are not lost upon power down of the terminal. The storage 512 may also include one or more of other types of read-only memory (ROM) and programmable and/or erasable ROM, random access memory (RAM), subscriber interface module (SIM), wireless interface module (WIM), smart card, or other fixed or removable memory device/media. The programs may also be provided via other media 513, such as disks, CD-ROM, DVD, or the like, which are read by the appropriate media drive(s) 514. The relevant software for carrying out terminal operations in accordance with the present invention may also be transmitted to the terminal 500B via data signals, such as being downloaded electronically via one or more networks, such as the data network 515 or other data networks, and an intermediate wireless network(s) 516.

For performing other standard terminal functions, the processor 510 is also coupled to user input interface 518 associated with the terminal 500B. The user input interface 518 may include, for example, a keypad, function buttons, microphone, joystick, scrolling mechanism (e.g., mouse, trackball), touch pad/screen, or other user entry mechanisms (not shown). These and other user input components are coupled to the processor 510 as is known in the art.

A user interface (UI) 520 is provided, which allows the user of the terminal 500A/B to perceive information visually, audibly, through touch, etc. For example, one or more display devices 520A may be associated with the terminal 500B. The display 520A can display the original/default and/or modified presentations as previously described. A speaker(s) 520B may be provided to present audible information. For example, a tone or other sound associated with a particular operator's brand may be included with the UI variant information, and played when the user activates the client that has been skinned or otherwise modified with that operator's UI information. Other user interface (UI) mechanisms can also be provided, such as tactile 520C or other feedback. The UI variant information may provide any type of presentation perceivable by the user.

The illustrated terminal 500B also includes conventional circuitry for performing wireless transmissions over the wireless network(s) 516. The DSP 522 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 524 includes at least a transmitter and receiver, thereby transmitting outgoing radio signals and receiving incoming radio signals, generally by way of an antenna 526.

In one embodiment, the storage/memory 512 stores the various client programs and data used in connection with the present invention. For example, the storage/memory 512 includes storage to store the client programs/applications 530 that when first opened initiate the UI variant infusion concept according to the present invention. The storage/memory 512 stores the Master URI(s) 532 that notifies the terminal 500B of the address of the configuration server system/CDB. The storage/memory 512 also includes the terminal-related information 534 as described above. Upon receiving the UI variant information from the CDB, the UI variant information 536 may be temporarily or permanently stored. These client and data modules are representative of the types of functional and data modules that may be associated with a terminal in accordance with the invention, and are not intended to represent an exhaustive list.

FIG. 5 also depicts a representative computing system 550 operable on the network for identifying and providing the UI variant information, and optionally other information such as catalog information or other information associated with the particular application. In one embodiment of the invention, the computing system 550 represents the configuration server system previously described.

In one embodiment, the computing system 550 represents the configuration server system previously described. The server system 550 may be a single unit, or a distributed system. In one embodiment of the invention, the configuration server system is distributed to multiple locations, and may be a globally distributed system. Although the server is distributed to multiple locations, one embodiment involves replicating the database, i.e. each node provides some or all of the same services. This ensures, among other things, redundancy in the event that a node(s) has failed.

The computing system/server 550 includes a processing arrangement 552, which may be coupled to the storage/memory 554. The processor 552 carries out a variety of standard computing functions as is known in the art, as dictated by software and/or firmware instructions. The storage/memory 554 may represent firmware, media storage, and/or memory. The processor 552 may communicate with other internal and external components through input/output (I/O) circuitry 556. The computing system 550 may also include media drives 558, such as hard and floppy disk drives, CD-ROM drives, DVD drives, and other media 560 capable of reading and/or storing information. In one embodiment, software for carrying out the operations at the computing system 550 in accordance with the present invention may be stored and distributed on CD-ROM, diskette, removable memory, or other form of media capable of portably storing information, as represented by media devices 560. Such software may also be transmitted to the system 550 via data signals, such as being downloaded electronically via a network such as the data network 515, Local Area Network (LAN) (not shown), wireless network 516, and/or any combination thereof.

In accordance with one embodiment of the invention, the storage/memory 554 and/or media devices 560 store the various programs and data used in connection with the present invention. For example, the single or distributed CDB 562 includes the UI variant information, and optionally other data that the requesting client may need for the particular application. The UI variant identification module 564 represents the software/firmware or other program information that is operable in connection with the processing control unit 552 to identify the appropriate UI variant information for a particular requesting client. The UI variant identification module 564 may include, for example, a database indexing program(s) that uses the received terminal-related information to identify the appropriate UI variant information stored in the CDB 562. The UI variant identification module 564 may alternatively or additionally include comparison functionality to compare certain received terminal-related information to stored information to identify the appropriate UI variant information stored in the CDB 562. Any desired manner of locating the appropriate UI variant information stored in the CDB 562 using the terminal-related information may be employed.

The storage/memory 554 and/or other media devices 560 may also include a redirect module 565, which is operable with the processor 552 to redirect the query and terminal-related information to any other desired URI. If redirection is to be employed in this fashion, the configuration server system 550 redirects the information to the other URI to be processed in the manner that the configuration server system 550 would otherwise have processed the information in accordance with the invention. Such redirection facilitates the creation of CDB subsystems, such as virtual CDBs within the global CDB system, that are dedicated to different purposes, and that can ensure flexible scalability.

The illustrated computing system 550 also includes DSP circuitry 566, and at least one transceiver 568 (which is intended to also refer to discrete transmitter/receiver components). While the server 550 may communicate with the data network 515 via wired connections, the server may also/instead be equipped with transceivers 568 to communicate with wireless networks 516 whereby an antenna 570 may be used.

Using the foregoing specification, some embodiments of the invention may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium," "computer program product," or other analogous language are intended to encompass a computer program existing permanently, temporarily, or transitorily on any computer-usable medium such as on any memory device or in any transmitting device.

For example, one embodiment of the invention includes a computer-readable medium having instructions stored thereon that are executable by a computing system for initiating the UI variant concept upon first use of the client residing on a terminal. Another embodiment includes a computer-readable medium having instructions stored thereon that are executable by a computing system for providing the UI variant information to a requesting terminal in response to receiving the terminal-related information.

From the description provided herein, those skilled in the art are readily able to combine software created as described with appropriate general purpose or special purpose computer hardware to create a computing system and/or computing subcomponents embodying the invention, and to create a computing system and/or computing subcomponents for carrying out the method of the invention.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method, comprising: detecting an initial activation of a base application pre-installed on a terminal, wherein the base application includes generic presentation components; upon detection of the activation, causing transmittal of terminal-related information comprising an identifier of the base application from the terminal to a configuration server; causing display of a list of selectable catalogs on the terminal, wherein a corresponding catalog address for each of the catalogs is provided to a configuration database from a plurality of independent sources; receiving an indication of a selection of one of the selectable catalogs; receiving application variant information corresponding to the terminal-related information comprising the identifier from the configuration server, wherein the application variation information is retrieved from a location identified by the address corresponding to the selected catalog; and causing a user interface of the base application to change according to the application variant information, wherein the application variant information includes information for modifying the generic presentation components.

2. The method of claim 1, further comprising retrieving an address of the configuration server upon initial activation of the base application at the terminal, and wherein transmitting the terminal-related information from the terminal comprises transmitting the terminal-related information to the configuration server addressed by the address.

3. The method of claim 2, wherein the retrieving an address comprises the base application initiating retrieval of a Uniform Resource Identifier (URI) corresponding to the configuration server.

4. The method of claim 1, wherein the application variant information is correlated to entity-specific information associated with at least one entity in a distribution chain of deliverable content to which the base application is requesting.

5. The method of claim 4, wherein modifying the user interface of the base application comprises modifying the user interface of the base application to include the entity-specific information.

6. The method of claim 1, wherein modifying the user interface of the base application comprises modifying the user interface of the base application with any one or more of visual presentations, audio presentations, or tactile presentations.

7. The method of claim 1, wherein modifying the user interface of the base application comprises modifying a visual presentation of the user interface of the base application with any one or more of display backgrounds, logos, icons, color schemes, trademarks or service marks.

8. The method of claim 1, wherein the terminal-related information comprises at least information identifying characteristics of the terminal.

9. The method of claim 1, wherein the terminal-related information comprises at least one of a User Agent Profile (UAProf), International Mobile Equipment Identifier (IMEI), the terminal's current language selection or roaming indicator.

10. The method of claim 1, wherein the terminal-related information comprises transmitting at least information identifying an operator or service provider associated with the service utilized by the base application.

11. The method of claim 1, wherein the terminal-related information comprises at least one or more of a Mobile Country Code (MCC), Mobile Network Code (MNC), Service Provider Name (SPN), or Short Message Service Center (SMSC) number.

12. The method of claim 1, further comprising obtaining updated application variant information after obtaining the application variant information upon the initial activation of the base application.

13. The method of claim 12, wherein obtaining updated application variant information after obtaining the application variant information upon the initial activation of the base application comprises obtaining the updated application variant information in response to a triggering event.

14. The method of claim 1, wherein the terminal-related information further comprises at least a software version of the base application, and wherein the method further comprises:
    determining whether the software version of the base application corresponds to an earlier version of the base application; and
    providing an updated software version of the base application if it is determined that the version of the base application provided via the terminal-related information corresponds to an earlier version of the base application.

15. The method of claim 1, further comprising providing content to the terminal together with the application variant information, wherein the content relates to the particular base application being executed on the terminal.

16. An apparatus, comprising: at least one processor and at least one memory including computer program code; the at least one memory and the computer program code configured to, with the at least one processor, cause the apparatus to at least: receive terminal-related information comprising an identifier of a base application from a terminal upon initial activation of the base application on the terminal, wherein the base application includes generic presentation components; cause transmittal of a list of catalogs to the terminal, wherein a corresponding catalog address for each of the catalogs is provided to a configuration database from a plurality of independent sources: receive an indication of a selected list of catalogs from the terminal; retrieve modified user interface information based on the terminal-related information comprising the identifier, wherein the modified user interface information is retrieved from a location identified by the address corresponding to the selected catalog; and cause transmittal of the modified user interface information to the terminal, wherein the modified user interface information includes information for modifying the generic presentation components.

17. The apparatus as in claim 16, wherein the apparatus comprises a database of the modified user interface information available for a plurality of terminals, and wherein the at least one memory, the computer program code, and the at least one processor are further configured to identify within the database the application variant information for a particular terminal based on the terminal information and identifier provided by that particular terminal.

18. The apparatus as in claim 16, wherein the apparatus comprises a plurality of servers distributed to multiple server locations, wherein at least some of the modified user interface information is replicated in databases associated with each of the multiple server locations.

19. The apparatus as in claim 16, further comprising a redirect module executable by the processing arrangement and configured to redirect the terminal information and responsibility of deriving the modified user interface information to an alternative server addressable by an address available to the apparatus.

20. The apparatus as in claim 16, wherein the at least one memory, the computer program code, and the at least one processor are configured to derive the modified user interface information by using the terminal information to identify an entity-specific modified user interface information from a plurality of modified user interface information sets corresponding to different entities.

21. An apparatus, comprising: at least one processor and at least one memory including computer program code; the at least one memory and the computer program code configured to, with the at least one processor, cause the apparatus to at least: detect activation of a base application comprising generic presentation components; cause transmittal of terminal-related information comprising an identifier of the base application to a configuration server; cause display of a list of selectable catalogs, wherein a corresponding catalog address for each of the catalogs is provided to a configuration database from a plurality of independent sources; receive an indication of a selection of one of the selectable catalogs; receive user interface modification information from the configuration server based on the terminal-related information comprising the identifier, wherein the user interface modification information is retrieved by the configuration server from a location identified by the address corresponding to the selected catalog; and cause a display of the base application to change based on the user interface modification information, wherein the user interface modification information includes information for modifying the generic presentation components.

22. The apparatus as in claim 21, wherein the at least one memory, the computer program code, and the at least one processor are further configured to at least cause an audio presentation provided via at least one speaker.

23. A computer program product comprising a non-transitory computer readable storage medium having computer program code stored thereon, the computer program code being configured to, when executed, cause an apparatus to at least: receive terminal-related information comprising an identifier of a base application from a terminal upon initial activation of the base application on the terminal, wherein the base application includes generic presentation components; cause transmittal of a list of catalogs to the terminal, wherein a corresponding catalog address for each of the catalogs is provided to a configuration database from a plurality of independent sources: receive an indication of a selected list of catalogs from the terminal; retrieve modified user interface information associated with the generic presentation components for the base application based on the terminal-related information comprising the identifier, wherein the modified user interface information is retrieved from a location identified by the address corresponding to the selected catalog, wherein the modified user interface information includes information for modifying the generic presentation components; and cause transmittal of the modified user interface information to the terminal.

24. A computer program product comprising a non-transitory computer readable storage medium having computer program code stored thereon, the computer program code being configured to, when executed, cause an apparatus to at least: detect a first activation of a base application pre-installed on a terminal wherein the base application includes generic presentation components; upon detection of the activation, cause transmittal of terminal-related information comprising an identifier of the base application to a configuration server; cause display of a list of selectable catalogs on the terminal, wherein a corresponding catalog address for each of the catalogs is provided to a configuration database from a plurality of independent sources; receive an indication of a selection of one of the selectable catalogs; receive application variant information based on the terminal-related information comprising the identifier and the selected catalog, wherein application variant information is retrieved by the configuration server from a location identified by the address corresponding to the selected catalog; and cause a display of the base application to change based on the application variant information, wherein the application variant information includes information for modifying the generic presentation components.

25. A system, comprising: (A) a terminal including: a user interface including generic presentation components; and a terminal processing system configured to recognize a first activation of a client application pre-installed on the terminal, to initiate transmission of terminal-related information comprising a client identifier to a target address in response to recognizing the initial activation of the client application, to receive an indication of a selection of a plurality of selectable catalogs, each from a plurality of independent sources, and to cause modification of the generic presentation components pursuant to received user interface modification information; and (B) a configuration server accessible at the target address including: a receiver configured to receive the terminal-related information including the client identifier, and the indication of the selected catalog; a user interface variant identification module executable by a server processing system and configured to retrieve the user interface modification information based on the terminal-related information including the client identifier, wherein the user interface modification information is retrieved from a location identified by the address corresponding to the selected catalog; and a transmitter configured to transmit the user interface modification information to the terminal for use by the client application in modifying the presentation associated with the client application via the user interface according to the interface modification information; wherein the terminal is configured to modify the generic presentation components of the client application, according to the modified user interface information received from the user interface variant identification module.

* * * * *